US010181253B2

(12) United States Patent
Anaya

(10) Patent No.: US 10,181,253 B2
(45) Date of Patent: Jan. 15, 2019

(54) SYSTEM AND METHOD FOR EMERGENCY SITUATION BROADCASTING AND LOCATION DETECTION

(71) Applicant: On View Security, San Jose, CA (US)

(72) Inventor: Joel Anaya, San Jose, CA (US)

( * ) Notice: Subject to any disclaimer, the term of this patent is extended or adjusted under 35 U.S.C. 154(b) by 0 days.

(21) Appl. No.: 15/857,468

(22) Filed: Dec. 28, 2017

(65) Prior Publication Data
US 2018/0182232 A1    Jun. 28, 2018

Related U.S. Application Data

(60) Provisional application No. 62/439,892, filed on Dec. 28, 2016.

(51) Int. Cl.
| | |
|---|---|
| *H04W 4/90* | (2018.01) |
| *G08B 25/01* | (2006.01) |
| *H04M 1/725* | (2006.01) |
| *G01S 19/17* | (2010.01) |
| *G08B 25/00* | (2006.01) |

(52) U.S. Cl.
CPC .......... *G08B 25/016* (2013.01); *G01S 19/17* (2013.01); *G08B 25/006* (2013.01); *H04M 1/72538* (2013.01); *H04W 4/90* (2018.02)

(58) Field of Classification Search
CPC ................................................... G08B 25/016

USPC ........................................................ 455/404.2
See application file for complete search history.

(56) References Cited

U.S. PATENT DOCUMENTS

| | | | | |
|---|---|---|---|---|
| 2006/0132294 | A1* | 6/2006 | Spark | B60R 25/1003 340/426.1 |
| 2009/0303066 | A1* | 12/2009 | Lee | H04M 3/42136 340/679 |
| 2014/0152468 | A1* | 6/2014 | Obenchain | A61M 16/20 340/870.09 |

* cited by examiner

*Primary Examiner* — Joel Ajayi
(74) *Attorney, Agent, or Firm* — Bold IP, PLLC; Hyungsoo Ahn

(57) ABSTRACT

Embodiments for a system and method for emergency situation broadcasting and location detection are provided. The system includes a computing environment, a network, a user computing device with a user interface, a rescue program, an emergency services server and database, an emergency service computing device, and a transponder. A process for emergency situation broadcasting and location detection is also provided that includes activating a rescue program, determining whether an alert state or rescue is requested, activating an alarm state, alerting emergency services, relaying relevant important information, determining if the rescue program is to be deactivated, alerting emergency services, and closing the rescue program.

18 Claims, 3 Drawing Sheets

SYSTEM AND METHOD FOR EMERGENCY SITUATION BROADCASTING AND LOCATION DETECTION

CROSS-REFERENCE TO RELATED APPLICATIONS

This application claims priority to U.S. Provisional Application No. 62/439,892 filed on Dec. 28, 2016. The content of the above application is incorporated by reference in its entirety.

FIELD OF THE DISCLOSURE

This disclosure relates generally to the field of emergency situation alert systems. More specifically, this disclosure relates to a system and method for alerting emergency services that the user is in an emergency situation, and also sending information related to the user's location and surroundings to emergency services.

BACKGROUND

The Amber Alert system was initially developed to help search for abducted persons by rapidly broadcasting information pertaining to abductions to a vast public audience to help investigators find the abductees. Prior to the Amber Alert system, information was typically broadcasted over conventional media outlets such as television. The Amber Alert system took this process a step further by also broadcasting information over a several different electronic media including large electronic billboards and emergency alerts via smart phone. This alert system further included details about the abduction, such as the make and model of the car of the abductor, the age and gender of the abductee, and the last known whereabouts of both the abductor and abductee. The system also provides a contact phone number or hotline so that anyone with information regarding the abduction can provide said information to proper authorities.

However, the current Amber Alert system has several shortcomings including a delay of relaying information, i.e., there is often a significant amount of time that passes between the time the abduction occurred to the time the alert is shown to the public. Additionally, the information provided by the Amber Alert system is often limited to alphanumerical information and a few photographs of the person who is missing.

There are several existing prior art that attempt to remedy this problem. For example, U.S. Patent Application 2016/0071399 A1 discloses a system that uses microphones on a computer to monitor audio to recognize user set keys such as words or phrases to generate an alert to third parties in emergency situations. This disclosure primarily focuses on embodiments that allow the system to continuously monitor audio even when not physically activated because users may be in emergency situations where they cannot physically activate the system. However, this disclosure appears to lack any teaching or suggestion of a live video feed once the system is activated. Rather, this disclosure collects or records audio upon activation and transmit said audio to emergency services rather than providing a live, interactive stream. Additionally, there is no teaching or suggestion of sending this information and live stream to the general public near or around the user's location, similar to an Amber Alert, to allow crowdsourcing of information to help locate the abductee and/or abductor faster.

U.S. Pat. No. 8,862,092 discloses an emergency notification system that sends photo/video captures or streams to emergency services or emergency contacts to upon activation. This disclosure includes an application for mobile devices that allows the user to send information including GPS information, photos, and/or videos to a secure server that can be accessed by emergency responders and emergency contacts through a wireless network. However, this disclosure appears to lack any teaching or suggestion of keeping the application running and visible to show an abductor or perpetrator that he/she is being recorded. Additionally, there is no teaching or suggestion of sending this information and live stream to the general public near or around the user's location, similar to an Amber Alert, to allow crowdsourcing of information to help locate the abductee and/or abductor faster.

Thus, there is a need for a system and method for emergency situation broadcasting and location detection that overcomes these and the many other shortcomings of conventionally available techniques.

SUMMARY

In one aspect, a system and method for emergency situation broadcasting and location detection is presented herein according to one or more embodiments. In one or more embodiments, a method or process for emergency situation broadcasting and location detection is presented herein according to one or more embodiments. In one, non-limiting embodiment, this process may include activating a rescue program, determining whether an alert state is requested, activating an alert state, alerting emergency services, relaying relevant important information to emergency services, determining whether the rescue program is requested to be deactivated, alerting emergency services, and closing the program. The process may further include the step of alerting predetermining emergency contacts, electronic billboard services, or anyone within a predetermined radius of the GPS location of the user computing device transmitted.

In one or more embodiments, a system for emergency situation broadcasting and location detection is presented herein according to one or more embodiments. In one, non-limiting embodiment, this system may include a computing environment, a network, a user computing device, a user interface, a rescue program, an emergency services server and database, an emergency service computing device, and a transponder. This system may further include a user computing devices with computer executable instructions stored thereon, which when executed, causes the user computing device to perform the steps of activating a rescue program on a user computing device, wherein the rescue program is designed to alert a emergency services, determining, if an alarm state has been requested, activating the alarm state, alerting emergency services, transmitting a set of information, including photo, audio, video, acceleration, velocity, altitude, facial recognition, global positioning system (GPS) location information, and fingerprints, to emergency services, determining whether the rescue program is requested to be deactivated, alerting emergency services to indicate the user has deactivated the alarm state, and deactivating the alarm state.

In some embodiments, the preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
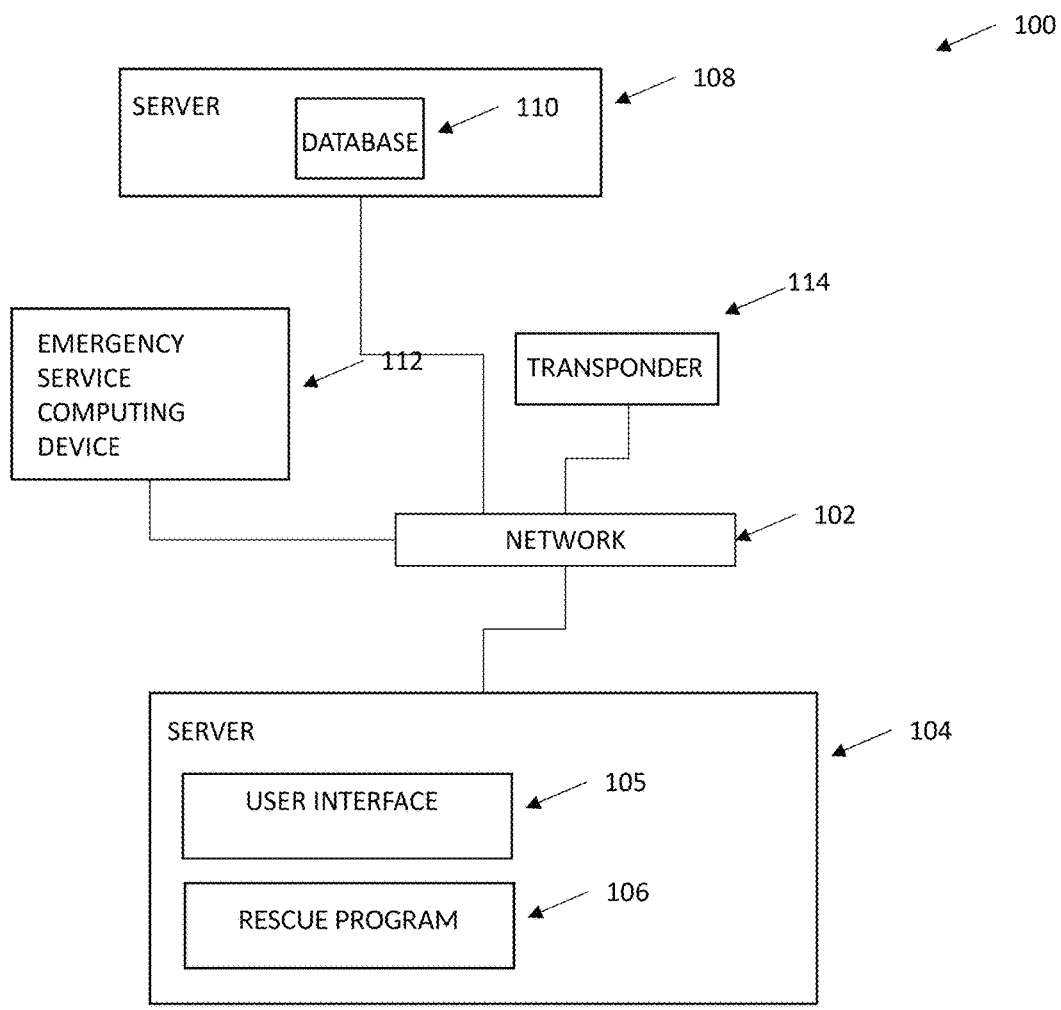
FIG. 1 shows a block diagram for a system and method of depicts a block diagram of a system and method of emergency situation broadcasting and location detection according to embodiments of the present disclosure.

In the Summary above, this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Embodiments in the present description are generally directed to a system and method for emergency situation broadcasting and location detection. Further details are provided below with reference to the Figures.

Turning to FIG. 1, a block diagram shows a general depiction of the system and method for emergency situation broadcasting and location detection in accordance with one or more embodiments. FIG. 1 shows a computing environment 100 which includes a network 102, a user computing device 104, a user interface 105, a rescue program 106, a server 108, a database 110, and an emergency services computing device 112. As depicted, the computing environment 100 provides an environment for rescue program 106 to access the user interface 105, database 110, and emergency services computing device 112. The computing environment 100 may include additional servers, computers, or other devices not shown. In one or more embodiments, the network 102 may be a local area network (LAN), a wide area network (WAN) such as the internet, any combination thereof, or any combination of connections and protocols that can support communications between the user computing device 104, the server 108, and the emergency services computing device 112. The network 102 may also include wired, wireless, or fiber optic connections. Those of ordinary skill in the art will appreciate that other types of connections may be used as well.

The user computing device 104 may be a desktop computer, laptop computer, tablet computer, netbook computer, personal computer (PC), a mobile device such as a mobile phone, or any programmable electronic device capable of communicating via a network 102. In other embodiments, the user computing device 104 may be any electronic device or computing system capable of sending and receiving data and communicating with a server 108 and an emergency service device 112 via a network 102.

The user interface 105 operates on a user computing device 104 to generate display signals corresponding to content, such as windows, menus, icons, 3D models, review and validation instructions, vital product data file information, and to receive various forms of user input. In one embodiment, the user interface 105 features an interface to rescue program 106 in which the user interface 105 may send input to the rescue program 106 and alert emergency services. The rescue program 106 may operate to analyze, categorize, determine, and then provide valuable information to the database 110 and the emergency services computing device 112. In one or more embodiments, the rescue program 106 may be located on the user computing device 104 and utilize the network 102 to communicate with the database 110 and the emergency services computing device 112. In another embodiment, the rescue program 106 resides on the user computing device 104. In other embodiments, the rescue program 106 resides on another server or computing device provided the rescue program 106 has access to the database 110 and the emergency service computing device 112.

The server 108 may be a management server, a web server, or any other electronic device or computing system capable of processing program instructions and receiving and sending data. In some embodiments, the server 108 may be a laptop computer, tablet computer, netbook computer, personal computer (PC), a desktop computer, or any programmable electronic device capable of communicating with the user computing device 104 and the emergency services computing device 112 via the network 102. In other embodiments, the server 108 may represent a server computing system utilizing multiple computers as a server system, such as in a cloud computing environment. In another embodiment, the server 108 may represent a computing system utilizing clustered computers and components to act as a single pool of seamless resources. In other embodiments, the server 108 may include the database 110. In other embodiments, server 108 may include any combination of the user interface 105, rescue program 106 and database 110.

The database 110 may be a repository that may be written to and/or read by a program 106. Information gathered from the program 106 may be stored to the database 110. Such information may include a global positioning system (GPS) location, videos, pictures, text, audio, finger prints, or the like received from the user computing device 104. In one embodiment, the database 110 is a database management system (DBMS) used to allow the definition, creation, querying, update, and administration of a database(s). The database 106 may reside on server 108. In other embodiments, the database 110 resides on another server, or another computing device, provided that the database 110 is accessible to the user computing device 104, rescue program 106, and emergency services computing device 112.

The emergency services computing device 112 may be a desktop computer, laptop computer, tablet computer, netbook computer, personal computer (PC), a desktop computer, mobile device, or any programmable electronic device capable of communicating via the network 102. In other embodiments, the emergency services computing device 112 may be any electronic device or computing system capable of sending and receiving data, and communicating with user the computing device 102 and the server 108 via a network 102.

Figure 2:
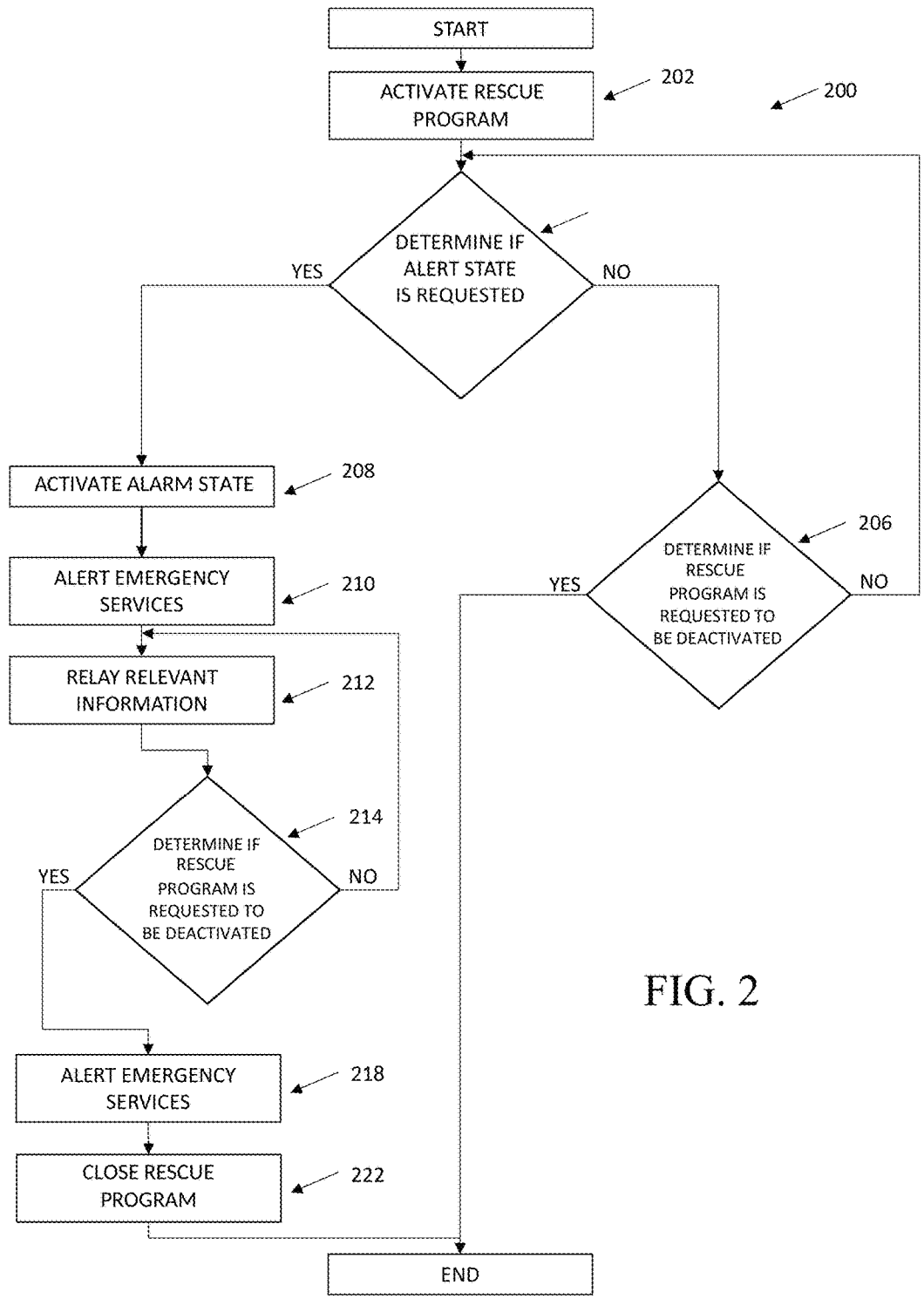
FIG. 2 shows a block diagram of a flowchart according to embodiments of the present disclosure.

FIG. 2 depicts flowchart 200 of the rescue program 106, executing within the computing environment 100 of FIG. 1, in accordance with one or more embodiments. The rescue program 106 gathers data once activated to provide the emergency services with as much information as possible, including the abductee and abductor's personal information or physical description to increase the chances of locating the abductor and/or the abductee.

In step 202, the rescue program 106, also known as the abduction program, is activated by a user. In one or more embodiments, the rescue program 106 is activated upon opening the program 106 on a user computing device 104. In another embodiment, the rescue program 106 is activated by inputting a password after opening the program 106. The password can be, for example, a series of alphanumerical characters, voice activation, retina, finger print, heart rate, oxygen levels, perspiration, shaking/convulsing, choking or muscle spasms, hives (allergic reaction), rashes, or other biometric indicia that the user device 102 is able to measure based on skin/body condition or action. In one or more embodiments, the rescue program 106 requires more than one activation method to activate. In other embodiments, once the rescue program 106 is activated it is running in the background of the user computing device 104 and does not require user interaction to remain active. For example, the rescue program 106 will keep or lock the user computing device 104 in an "on" mode so that the display of the user computing device 104 will remain on and the rescue program 106 visible.

In the alarm state determination step 204, the rescue program 106 determines if the rescue program 106 has entered the alarm state. In one or more embodiments, the rescue program 106 enters the alarm state by the use of the user interface 105 such as by depressing a button or initiating a haptic sensor, or non-physical touch means including voice activation, video detection, picture detection, vibration detection and/or the like. For example, the user interface 105 may have a button the user has to hold on to and if they remove pressure from the button the alarm state is activated. Another example is if the user computing device 104 has an audio sensor, such as a microphone, which hears or detects a predetermined noise or sound pattern and activates the alarm state. Another example, is if the user computing device 104 has a camera which captures a predetermined video of that which would be common with someone being abducted or in danger. The rescue program 106 can use one or more of its features to determine if the alarm state is to be activated. If the rescue program 106 determines that the data gathered reaches a predetermined threshold, the alarm state is activated (YES direction, proceed to step 208). If the rescue program 106 determines that the data fathered does not reach the predetermined threshold, the rescue program 106 determines if the user deactivated the program (NO direction, proceed to step 206).

In step 206, the rescue program 106 determines if the rescue program 106 has been deactivated. In one embodiment, the rescue program 106 determines the rescue program 106 has been deactivated by the user closing the rescue program 106. In another embodiment, the user will remove their finger from the user interface 105 or press a deactivation button on the user interface 105. In other embodiments, the user may need to say or input a password or reach a specific geographical location in a predetermined time, or call/contact an emergency contact. If the rescue program 106 determines that the predetermined sequence of actions has been completed, the rescue program 106 deactivates (YES direction, proceed to END). If the rescue program 106 determines that the predetermined sequence has not been completed, the rescue program 106 maintains the active mode (NO direction, proceed to step 204).

In step 208, the rescue program 106 activates the alarm state. In one or more embodiments, the activation of the alarm state sends a silent signal, an audible signal, or both a silent and audible signal to the emergency service computing device 112 and the database 110. In other embodiments, the activation of the alarm state turns on all data capturing features of the user computing device 104 including a camera, microphone, GPS, user interface 105, touch sensitive elements, and the like in order to capture, record, and live stream photos, videos, and audio and relay GPS information. The touch sensitive elements may be the buttons or screen that could possible capture the abductor or the abductee's finger prints.

In step 210, the rescue program 106 alerts the emergency services. In one embodiment, the emergency services include the police, ambulance, firefighters, and the like. In other embodiments, the emergency services are contacts in the user computing device 104 which are programmed to receive notifications when the rescue program 106 is activated. The notifications can be, for example, a text message, and email, a phone call, a voice mail, or any of the information captured or recorded by the user computing device 104 including photos, videos, audio, and GPS information. In other embodiments, an alert may also be sent anyone with a user computing device 104 such as a mobile device or smart phone capable of receiving such alerts and located within close proximity or a particular radius of the GPS information relayed or transmitted by the abductee's user computing device 104. In other embodiments, the emergency services are directly connected to billboard companies that regularly display emergency information on electronic billboards to quickly display the abductee's information to all people within a predetermined radius of the user computing device 104. The radius can be predetermined by the user or be configured as a default setting within the rescue program 106. In one embodiment, this radius is 10 miles. In other embodiments, this radius can be greater or less than the 10 miles depending on the settings or needs of the emergency services and the rescue program 106.

In step 212, the rescue program 106 relays relevant information to the emergency services. In one embodiment, the rescue program 106 continues to relay all relevant information to the emergency services computing device 112 and database 110. The relevant information can be, for example, videos, pictures, audio, acceleration, velocity, altitude, facial recognition, global positioning system (GPS) location information, fingerprints, vibrations, and the like gathered by the user computing device 104. The video and audio may be transmitted as a live stream or a live feed so that emergency services may see what is happening in real time. The information, according to other embodiments, may be edited in or processed by the user computing device 104 for clarity before sending or transmitting.

In step 214, the rescue program 106 determines if the rescue program 106 has been deactivated. In one embodiment, the rescue program 106 determines the rescue program 106 has been deactivated by the user closing the rescue program 106. In another embodiment, the user will remove their finger from the user interface 105 or press a deactivation button on the user interface 105. In other embodiments, the user may need to say or input a password or reach a specific geographical location in a predetermined time, or call/contact an emergency contact. If the rescue program 106 determines that the predetermined sequence of actions has been completed, the rescue program 106 deactivates (YES direction, proceed to step 218). If the rescue program 106 determines that the predetermined sequence has not been completed, the rescue program 106 maintains the active mode (NO direction, proceed to step 210).

In step 218, the rescue program 106 alerts the emergency services of deactivation. In one embodiment, the rescue program 106 sends a notification that the program has been deactivate and the emergency state has ended. In other embodiments, the user needs to personally contact each of the predetermined emergency services to fully deactivate the rescue program 106. In additional embodiments, the user needs to send predetermined information to the emergency services to deactivate the rescue program 106. In step 222, the rescue program 106 is deactivated and closed. In one embodiment, rescue program 106 closes itself on the user computing device 102. In other embodiments, rescue program 106 is closed but remains running in the background of the user computing device 102.

Figure 3:
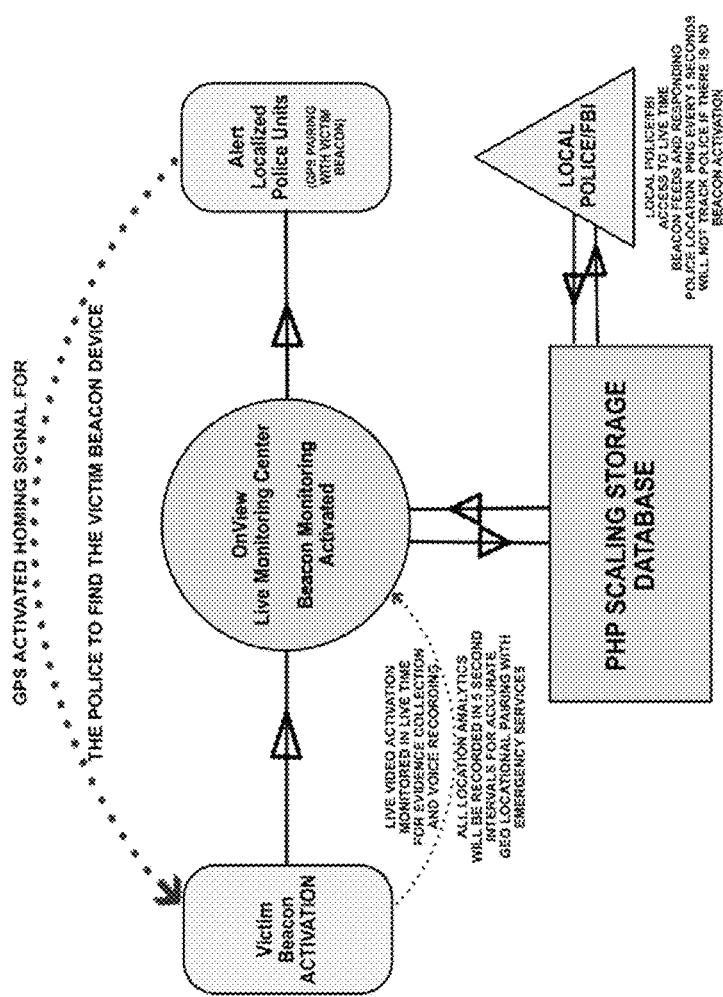
FIG. 3 shows a diagram of one embodiment of the present disclosure.

FIG. 3 depicts a diagram of the location system, in accordance with one or more embodiments. In this depicted embodiment, OnView security has a central location known as the live monitoring center that receives all the alerts and activations and forwards the necessary information to the appropriate parties. In the shown embodiment, the location of the victim is sent directly to the police while the video recording is sent to the monitoring location, which then sends the information to the police, and a database that is accessible by the police and other government agencies that would be able to help locate the victim.

While preferred and alternate embodiments have been illustrated and described, as noted above, many changes can be made without departing from the spirit and scope of the embodiments provided in the present disclosure. Accordingly, the scope of the embodiments provided in the present disclosure, is not limited by the disclosure of these preferred and alternate embodiments. Instead, the scope of the invention title be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶ 6. In particular, the use of "step of" in the claims herein is not intended to invoke the provisions of U.S.C. § 112 ¶ 6.

What is claimed is:

1. A method for emergency situation broadcasting and location detection, the method comprising:
    under control of a user mobile device, activating, by one or more processors, a rescue program;
    activating, by one or more processors, the alarm state;
    in response to activating an alarm state, alerting, by one or more processors, one or more emergency services;
    in response to activating an alarm state, transmitting, by one or more processors, a set of information to one or more emergency services;
    in response to activating an alarm state, transmitting, by one or more processors, a set of information to one or more non-emergency services;
    in response to activating the alarm state, locking the user device in an "on" mode and preventing deactivation of alarm state on the rescue program to keep the rescue program and alarm state active and visible;
    executing, by one or more processors, a predetermined sequence of actions to deactivate the alarm state;
    confirming, by one or more processors, that a user has executed the predetermined sequence of actions to deactivate the alarm state;
    in response to confirming that a user has executed the predetermined sequence of actions to deactivate the alarm state, deactivating, by one or more processors, the alarm state; and
    in response to deactivating the alarm state, alerting, by one or more processors, the one or more emergency services and one or more non-emergency services to indicate the alarm state has been deactivated;
    wherein the one or more emergency services comprises police, firefighters, ambulances, and local government agencies;

wherein the one or more non-emergency services comprises members of the general public, at least one predetermined emergency contact, and local electronic billboard services that display the set of information on electronic billboards;

wherein the predetermined sequence of actions comprises including notifying a predetermined emergency contact, taking the user mobile device to a predetermined geographic location, and inputting a predetermined passcode.

2. The method of claim 1, wherein the predetermined sequence of actions to deactivate the alarm state comprises inputting a predetermined passcode by at least one member of the one or more emergency services.

3. The method of claim 1, wherein the set of information comprises photo, audio, video, acceleration, velocity, altitude, facial recognition, global positioning system (GPS) location information, and fingerprints.

4. The method of claim 1, wherein the predetermined sequence of actions to deactivate the alarm state comprises inputting a predetermined passcode by at least one member of the one or more emergency services.

5. The method of claim 1, wherein the predetermined geographic location comprises a fire station, police station, and a home.

6. The method of claim 2, wherein the video or audio may be transmitted live, edited or as a recording.

7. The method of claim 1, wherein the member of the general public comprises anyone within a predetermined radius fixed around a predetermined geographic location of the user on which an alarm state has been activated.

8. The method of claim 1, wherein the activating, by one or more processors, the alarm state comprises interaction with a user interface on the rescue program, such as by depressing a button or initiating a haptic sensor.

9. The method of claim 1, wherein the activating, by one or more processors, the alarm state comprises non-physical means including voice activation or detection, picture or facial detection, and vibration detection.

10. A system for emergency situation broadcasting and location detection, the system comprising a computing environment, a network, a user computing device, a user interface, a rescue program, an emergency services server and database, an emergency service computing device, and a transponder, wherein the user computing devices has computer executable instructions stored thereon, the computer executable instructions, when executed by one or more processors, causes the user computing device to perform steps comprising:

under control of a user mobile device, activating, by one or more processors, a rescue program;

activating, by one or more processors, the alarm state;

in response to activating an alarm state, alerting, by one or more processors, one or more emergency services;

in response to activating an alarm state, transmitting, by one or more processors, a set of information to one or more emergency services;

in response to activating an alarm state, transmitting, by one or more processors, a set of information to one or more non-emergency services;

in response to activating the alarm state, locking the user device in an "on" mode and preventing deactivation of alarm state on the rescue program to keep the rescue program and alarm state active and visible;

executing, by one or more processors, a predetermined sequence of actions to deactivate the alarm state;

confirming, by one or more processors, that a user has executed the predetermined sequence of actions to deactivate the alarm state;

in response to confirming that a user has executed the predetermined sequence of actions to deactivate the alarm state, deactivating, by one or more processors, the alarm state; and in response to deactivating the alarm state, alerting, by one or more processors, the one or more emergency services and one or more non-emergency services to indicate the alarm state has been deactivated;

wherein the one or more emergency services comprises police, firefighters, ambulances, and local government agencies;

wherein the one or more non-emergency services comprises members of the general public, at least one predetermined emergency contact, and local electronic billboard services that display the set of information on electronic billboards;

wherein the predetermined sequence of actions comprises including notifying a predetermined emergency contact, taking the user mobile device to a predetermined geographic location, and inputting a predetermined passcode.

11. The system of claim 10, wherein the predetermined sequence of actions to deactivate the alarm state comprises inputting a predetermined passcode by at least one member of the one or more emergency services.

12. The system of claim 10, wherein the set of information comprises photo, audio, video, acceleration, velocity, altitude, facial recognition, global positioning system (GPS) location information, and fingerprints.

13. The system of claim 10, wherein the predetermined sequence of actions to deactivate the alarm state comprises inputting a predetermined passcode by at least one member of the one or more emergency services.

14. The system of claim 10, wherein the predetermined geographic location comprises a fire station, police station, and a home.

15. The system of claim 12, wherein the video or audio may be transmitted live, edited or as a recording.

16. The system of claim 10, wherein the member of the general public comprises anyone within a predetermined radius fixed around a predetermined geographic location of the user on which an alarm state has been activated.

17. The system of claim 10, wherein the activating, by one or more processors, the alarm state comprises interaction with a user interface on the rescue program, such as by depressing a button or initiating a haptic sensor.

18. The system of claim 10, wherein the activating, by one or more processors, the alarm state comprises non-physical means including voice activation or detection, picture or facial detection, and vibration detection.

* * * * *